US007050065B1

(12) United States Patent
Young (10) Patent No.: US 7,050,065 B1
(45) Date of Patent: May 23, 2006

(54) MINIMALIST COLOR SPACE CONVERTERS FOR OPTIMIZING IMAGE PROCESSING OPERATIONS

(75) Inventor: Wayne D. Young, Milpitas, CA (US)

(73) Assignee: NVIDIA Corporation, Santa Clara, CA (US)

( * ) Notice: Subject to any disclaimer, the term of this patent is extended or adjusted under 35 U.S.C. 154(b) by 106 days.

(21) Appl. No.: 10/825,259

(22) Filed: Apr. 15, 2004

(51) Int. Cl.
*G09G 5/02* (2006.01)

(52) U.S. Cl. .................................. 345/604; 345/605
(58) Field of Classification Search ......... 345/588–605
See application file for complete search history.

(56) References Cited

U.S. PATENT DOCUMENTS

| | | | |
|---|---|---|---|
| 5,726,682 A | 3/1998 | Lum et al. | |
| 5,784,050 A * | 7/1998 | Corry | 345/604 |
| 5,914,753 A | 6/1999 | Donovan | |
| 6,014,125 A | 1/2000 | Herbert | |
| 6,034,665 A | 3/2000 | Kim | |
| 6,100,870 A | 8/2000 | Ohara | |
| 6,229,580 B1 | 5/2001 | Inoue | |
| 6,271,827 B1 * | 8/2001 | Matsumoto | 345/601 |
| 6,281,873 B1 | 8/2001 | Oakley | |
| 6,348,950 B1 | 2/2002 | Kishida | |
| 6,489,965 B1 | 12/2002 | Voorhies | |
| 6,518,970 B1 * | 2/2003 | Glen et al. | 345/501 |
| 6,674,487 B1 | 1/2004 | Smith | |
| 6,934,411 B1 * | 8/2005 | Bezryadin | 382/162 |
| 2003/0184559 A1 * | 10/2003 | Jiang et al. | 345/600 |
| 2004/0070677 A1 * | 4/2004 | Adams et al. | 348/222.1 |
| 2004/0119721 A1 * | 6/2004 | Kim | 345/600 |

FOREIGN PATENT DOCUMENTS

| | | |
|---|---|---|
| EP | 0881822 A2 | 12/1998 |
| EP | 0969674 A2 | 1/2000 |

OTHER PUBLICATIONS

Michael Vrhel, "Color Image Resolution Conversion," *IEEE Transactions on Image Processing*, Mar. 2005 vol. 14(3): pp. 328-333.

(Continued)

*Primary Examiner*—Matthew Luu
(74) *Attorney, Agent, or Firm*—Patterson & Sheridan, LLP (57) ABSTRACT

An apparatus for graphics processing unit, which includes a memory for storing pixel data in a red, green and blue (RGB) color space and a display pipeline. The display pipeline includes an RGB color space to a luminance color, blue color difference and red color difference (YCbCr) color space converter module configured to convert the pixel data from the RGB color space to the YCbCr color space. The RGB to YCbCr color space converter module generates a luminance color component (Y) of the pixel data by adding ¼ of a red color (R) component of the pixel data to ½ of a green color (G) component of the pixel data and ¼ of a blue color (B) component of the pixel data. The luminance color component (Y) of the pixel data may be determined by left shifting the green color (G) component of the pixel data by one bit, adding the result to the red color (R) component of the pixel data and the blue color (B) component of the pixel data, and right shifting the sum by two bits.

21 Claims, 5 Drawing Sheets

OTHER PUBLICATIONS

Soontorn Oraintara et al., "Image/Video Scaling Algorithm Based on Multirate Signal Processing," *IEEE Comput Soc.*, Oct. 1998 vol. 2(4): pp. 732-738.

Majid Rabbani et al., "An Overview of the JPEG 2000 Still Image Compression Standard," *Signal Processing: Image Communication*, 2002 vol. 17: pp. 3-48.

* cited by examiner

MINIMALIST COLOR SPACE CONVERTERS FOR OPTIMIZING IMAGE PROCESSING OPERATIONS

BACKGROUND OF THE INVENTION

1. Field of the Invention

Embodiments of the present invention generally relate to a method and apparatus for performing color space conversions, and more particularly between the red, green and blue (RGB) color space and the luminance color, blue color difference and red color difference (YCbCr) color space.

2. Description of the Related Art

The RGB color space is a digital format widely used in computer graphics and imaging. Red, green and blue are the primary additive colors. Components of these primary colors can be combined to form any desired color. The RGB color space is the most prevalent choice for computer graphics frame buffers (the memory used to hold images for display) because computer monitors use red, green and blue phosphors to create the desired color. Consequently, using the RGB color space simplifies the architecture and design of the system.

However, certain operations on the pixel data are better performed in another color space, such as the YCbCr color space. Accordingly, a color space conversion may need to be performed to convert the pixel data from the RGB color space to another color space, such as the YCbCr color space.

ITU-R BT.601 establishes the following formulas for converting from the RGB color space to the YCbCr color space:

$$Y = 0.299R + 0.587G + 0.114B \quad (1)$$

$$Cb = 0.564(B-Y) \quad (2)$$

$$Cr = 0.713(R-Y) \quad (3)$$

Color space conversion is often implemented by employing multipliers or look-up tables to achieve the multiplication operations, and by combining the resultant component products to complete the conversion. The multiplication operations dominate the operating efficiency and the hardware complexity of a color space converting apparatus. Therefore, the number of multiplication operations is crucial. A 3-by-3 multiplication is typically used for converting between any two color spaces of three color components. Although such a multiplication offers flexibility, it is relatively expensive to implement.

To perform the RGB to YCbCr color space conversion of equations (1) to (3), a conventional color space converter needs to first perform three multiplication operations to obtain the Y color signal, and then derive the (B−Y) and (R−Y) color difference signals before performing two more multiplication operations to obtain the Cb and Cr color signals, respectively. Although the color space converter requires only five multiplication operations that involve relatively simple hardware, the operating efficiency of the color space converter is relatively poor since the multiplication operations are done in two operating stages.

Equations (2) and (3) can be expanded so that the Cb and Cr color signals are entirely in terms of the R, G and B color signals:

$$Cb = -0.169R - 0.331G + 0.5B \quad (4)$$

$$Cr = 0.5R - 0.419G - 0.081B \quad (5)$$

As such, implementation of equations (1), (4) and (5) requires nine multiplication operations, which makes the color space conversion still a relatively expensive computational process.

Therefore, a need exists in the art for a more cost effective method for performing color space conversion between the RGB color space and the YCbCr color space.

SUMMARY OF THE INVENTION

One objective of various embodiments of the invention is to enable certain operations to be performed on the pixel data in one color space while operating within another color space.

Another objective of various embodiments of the invention is to provide an alternative color space out of the necessity to make pixel processing as simple as possible, while avoiding the cost of using standard color space converters.

Another objective of various embodiments of the invention is to provide an alternative color space that is close enough to the standard color space such that the visual difference from the human eye's perspective is negligible.

Various embodiments of the present invention are generally directed to a graphics processing unit, which includes a memory for storing pixel data in a red, green and blue (RGB) color space and a display pipeline. The display pipeline includes an RGB color space to a luminance color, blue color difference and red color difference (YCbCr) color space converter module configured to convert the pixel data from the RGB color space to the YCbCr color space. The RGB to YCbCr color space converter module generates a luminance color component (Y) of the pixel data by adding ¼ of a red color (R) component of the pixel data to ½ of a green color (G) component of the pixel data and ¼ of a blue color (B) component of the pixel data. The luminance color component (Y) of the pixel data may be determined by left shifting the green color (G) component of the pixel data by one bit, adding the result to the red color (R) component of the pixel data and the blue color (B) component of the pixel data, and right shifting the sum by two bits.

In one embodiment, the RGB to YCbCr color space converter module determines a blue color difference component (Cb) of the pixel data by subtracting the luminance color component (Y) of the pixel data from the blue color (B) component, and dividing the result by two. The blue color difference component (Cb) of the pixel data may be determined by subtracting the luminance color component (Y) of the pixel data from the blue color (B) component of the pixel data, and right shifting the sum by one bit.

In another embodiment, the RGB to YCbCr color space converter module determines a red color difference component (Cr) of the pixel data by subtracting the luminance color component (Y) of the pixel data from the red color (R) component of the pixel data; and dividing the result by two. The red color difference component (Cr) of the pixel data may be determined by subtracting the luminance color component (Y) of the pixel data from the red color (R) component of the pixel data; and right shifting the result by one bit.

In yet another embodiment, the display pipeline further comprises a YCbCr to RGB color space converter module configured to convert the pixel data from the YCbCr color space to the RGB color space. The YCbCr to RGB color space converter module generates the red color (R) component of the pixel data by adding the luminance color component (Y) to twice the red color difference component (Cr)

of the pixel data. The red color (R) component of the pixel data may be determined by left shifting the red color difference component (Cr) of the pixel data by one bit, and adding the result to the luminance color component (Y) of the pixel data.

In still another embodiment, the YCbCr to RGB color space converter module further generates the green color (G) component of the pixel data by subtracting the red color difference component (Cr) and the blue color difference component (Cb) of the pixel data from the luminance color component (Y) of the pixel data.

In still yet another embodiment, the YCbCr to RGB color space converter module further generates the blue color (B) component of the pixel data by adding the luminance color component (Y) of the pixel data to twice the blue color difference component (Cb) of the pixel data. The blue color (B) component of the pixel data may be determined by left shifting the blue color difference (Cr) component of the pixel data by one bit, and adding the result to the luminance color component (Y) of the pixel data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
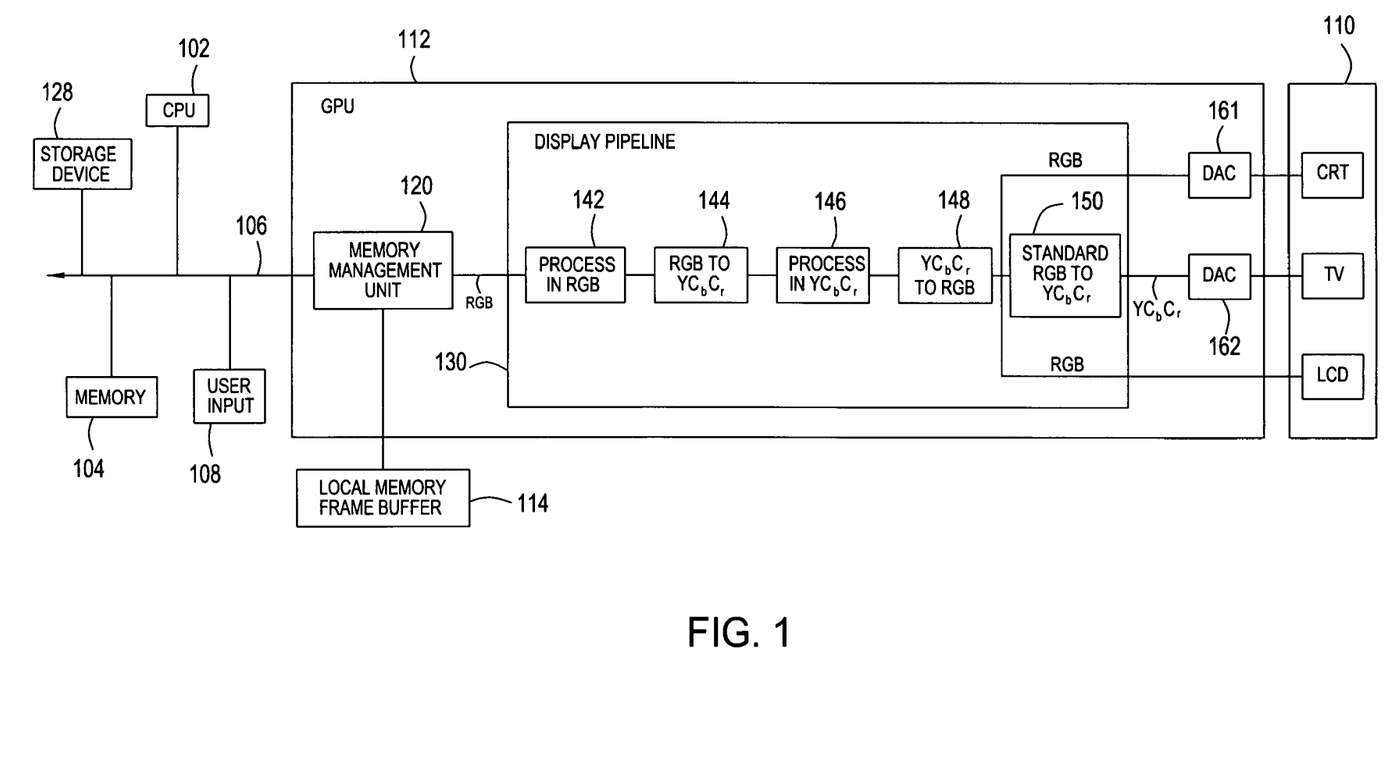
FIG. 1 illustrates a simplified block diagram of a computer system according to an embodiment of the present invention.

FIG. 1 illustrates a simplified block diagram of a computer system 100 according to an embodiment of the present invention. The computer system 100 includes a central processing unit (CPU) 102 and a system (main) memory 104 communicating via a system bus 106. User input is received from one or more user input devices 108 (e.g., keyboard, mouse) coupled to the system bus 106. Visual output is provided on a pixel based display device 110 (e.g., a conventional CRT, TV or LCD based monitor, projector, etc.) operating under control of a graphics processing unit (GPU) 112 coupled to the bus 106. Other components, such as one or more storage devices 128 (e.g., a fixed or removable magnetic disk drive, compact disk (CD) drive, and/or DVD drive), may also be coupled to the system bus 106. In one embodiment, the computer system 100 operates in a red, green and blue (RGB) color space. Although various embodiments of the invention are described herein with reference to the computer system 100 operating in the RGB color space, the invention contemplates the computer system 100 operating in other color spaces, such as YCbCr.

The system memory 104 stores various programs or applications, such as operating system programs for generating the pixel data to be processed by the GPU 112. Examples of operating system programs 130 include Graphical Device Interface (GDI) component of the Microsoft Windows operating system. The system memory 104 may further store a graphics driver program for enabling communication with the GPU 112. The graphics driver program may implement one or more standard application program interfaces (APIs), such as Open GL and Microsoft DirectX, for communication with the GPU 112. By invoking appropriate API function calls, the operating system programs are able to instruct the graphics driver program to transfer the pixel data to the GPU 112 via the system bus 106 and invoke various rendering functions of the GPU 112. Such pixel data are typically stored and represented in binary form. Data transfer operations may be performed using conventional DMA (direct memory access) or other operations. In one embodiment, the system memory 104 may store pixel data in the RGB color space.

The computer system 100 further includes a local memory or frame buffer 114 in communication with the GPU 112. The frame buffer 114 stores the pixel data to be read by a scanout control logic and transmitted to the display device 110 for display as an image. In one embodiment, the frame buffer 114 stores the pixel data in the RGB color space. Although the frame buffer 114 is shown as distinct and apart from the system memory 104, in some implementations, such as in a Unified Memory Architecture, the frame buffer 114 and the system memory 104 would share the same physical memory devices.

The GPU 112 includes various components for receiving and processing graphics system commands received via the bus 106. The GPU 112 includes a memory management unit 120 and a display pipeline 130. The memory management unit 120 reads the pixel data from the frame buffer 114 or the memory 104, places the pixel data in order and transmits the pixel data to the display pipeline 130 for processing.

The display pipeline 130 is generally used for image processing. The display pipeline 130 may contain various processing modules configured to convert the pixel data into pixel data suitable for displaying on the display device. In an embodiment in which the computer system 100 operates in the RGB color space, the display pipeline 130 may include a module 142 that processes the pixel data in the red green blue (RGB) color space. Examples of processing modules that operate in the RGB color space include brightness control, contrast control and gamma correction.

In one embodiment, the display pipeline 130 further includes an RGB to YCbCr color space converter module 144, which is configured to convert the pixel data from the RGB color space to the YCbCr space. A detailed description of the operations of the RGB to YCbCr color space converter module 144 is provided in the paragraphs below with reference to FIGS. 2–3.

Once the pixel data have been converted to the YCbCr space, the pixel data may be processed in the YCbCr space. Accordingly, the display pipeline 130 may further include a module 146 for processing the pixel data in the YCbCr color space. Examples of processing modules that operate in the YCbCr color space include color hue or saturation control.

In accordance with one embodiment of the invention, the display pipeline 130 further includes a YCbCr to RGB color space converter module 148, which is configured to convert the pixel data from the YCbCr space to the RGB space. In this manner, the pixel data may be converted back to the RGB space once the processing of the pixel data in the YCbCr space is completed. A detailed description of the operations of the YCbCr to RGB color space converter module 148 is provided in the paragraphs below with reference to FIGS. 4–5.

Although the display pipeline 130 has been described with reference to include one RGB to YCbCr color space converter module 144 followed by one YCbCr to RGB color space converter module 148, various embodiments of the invention contemplate the display pipeline 130 having one YCbCr to RGB color space converter module 148 followed by one RGB to YCbCr color space converter module 144. Various embodiments of the invention also contemplate the display pipeline 130 having any number of RGB to YCbCr color space converter modules 144 and any number of YCbCr to RGB color space converter modules 148.

In an embodiment in which the pixel data is displayed on a television screen, the display pipeline 130 further includes an industry standard RGB to YCbCr color space converter module 150 to convert the pixel data to the YCbCr space. The industry standard RGB to YCbCr color space converter module 150 operates in connection with a digital to analog converter 162 to display the pixel data on the television screen.

In an embodiment in which the pixel data is displayed on a CRT, the display pipeline 130 further includes a digital to analog converter 161 to convert the pixel data from digital to analog prior to being displayed on the CRT.

It will be appreciated that the computer system 100 is illustrative and that variations and modifications are possible. The computer system 100 may be a desktop computer, server, laptop computer, palm-sized computer, tablet computer, game console, set-top box, personal digital appliance, tethered Internet appliance, portable gaming system, cellular/mobile telephone, computer based simulator, or the like. The display device 110 can be any pixel-based display, e.g., a CRT or LCD monitor, projector, printer, etc. In some instances, multiple display devices (e.g., an array of projectors or CRT monitors) may be supported, with each device displaying a portion of the image data. The GPU 112 or any of its components may be implemented using one or more programmable processors programmed with appropriate software, application specific integrated circuits (ASICs), other integrated circuit technologies, or any combination of these. In view of the present disclosure, persons of ordinary skill in the art will recognize that the present invention can be embodied in a wide variety of system configurations.

Figure 2:
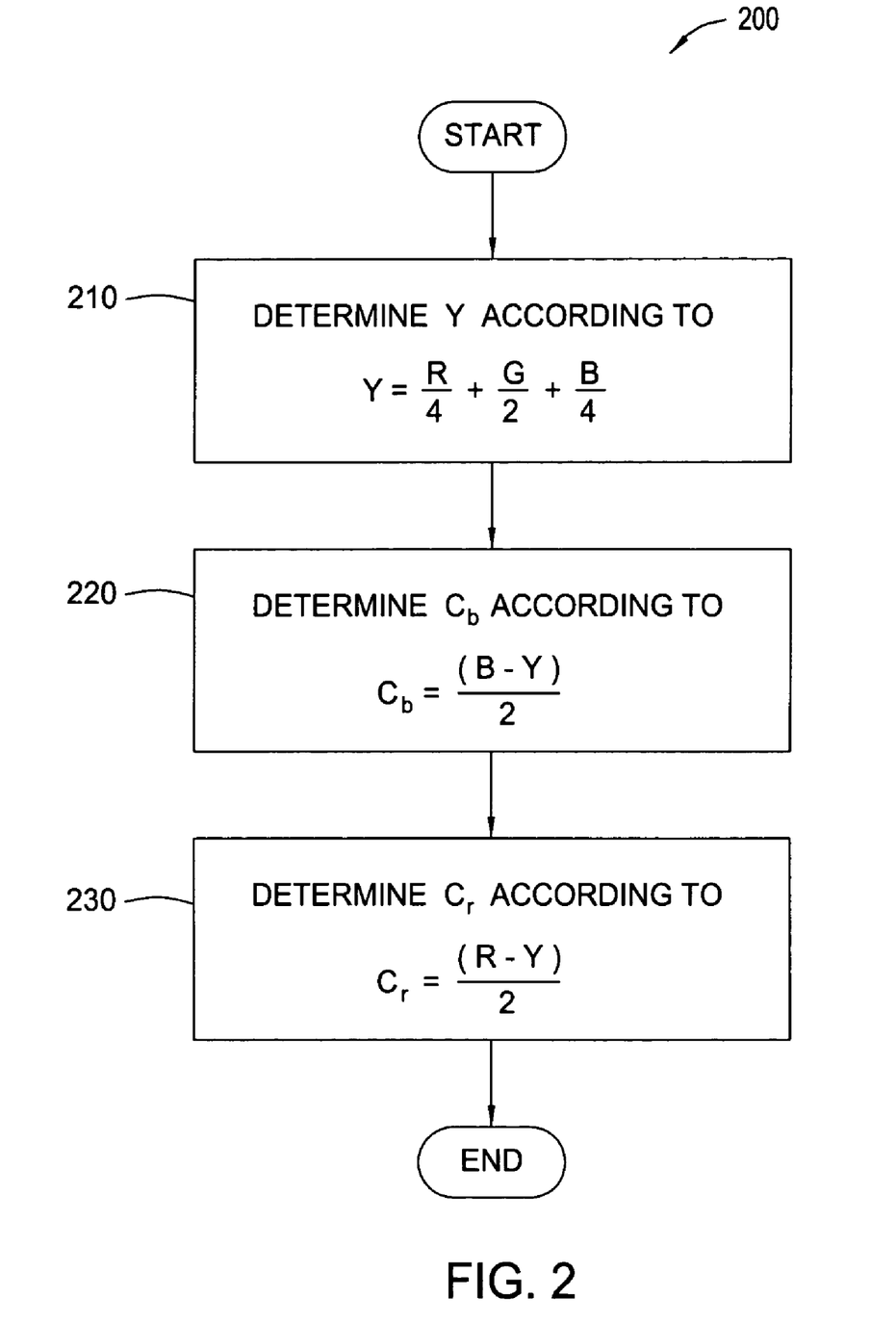
FIG. 2 is a flow diagram of a method for converting pixel data from an RGB space to a YCbCr space in accordance with one embodiment of the invention.

FIG. 2 is a flow diagram of a method 200 for converting pixel data from an RGB space to a YCbCr space in accordance with one embodiment of the invention. At step 210, a luminance color component (Y) of the pixel data is determined using the equation Y=R/4+G/2+B/4, where R is the red color component of the pixel data, where G is the green color component of the pixel data, where B is the blue color component of the pixel data. Notably, the color space coefficients used to determine the luminance color component (Y) in step 210 are in a binary form. Accordingly, the luminance color component (Y) may be calculated using binary arithmetic and avoid the use of multiplication, which allows the luminance color component (Y) to be determined in a relatively inexpensive manner.

Figure 3A:
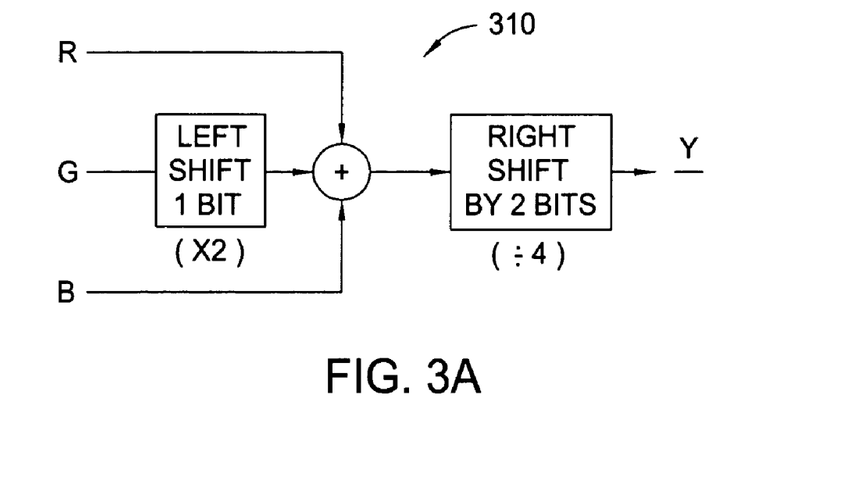
FIG. 3A illustrates a logic diagram for determining the luminance color component (Y) of the pixel data in accordance with one embodiment of the invention.

In accordance with one embodiment of the invention, the luminance color component (Y) of the pixel data may be determined according to a logic diagram 310 illustrated in FIG. 3A. As such, the luminance color component (Y) of the pixel data is determined by left shifting the green color component by one bit (which is equivalent to a multiplication by two), adding the result to the red color component and the blue color component, and right shifting the entire sum by two bits (which is equivalent to a division by four). In one embodiment, the logical diagram 310 may be refined by performing a numerical rounding operation prior to right shifting the entire sum by two bits. Numerical rounding is typically used to improve the accuracy of a result and prevents cumulative errors. The numerical rounding may be performed using conventional techniques, such as adding a value equal to 2 raised to the power of the number of shifted bits minus 1 (i.e., $2^{(s-1)}$, where s is the number of shifts) to the entire sum prior to right shifting the entire sum. Left shifting and right shifting operations are free to implement from a cost and computational resource perspectives. Accordingly, the luminance color component (Y) of the pixel data may be determined in a relatively inexpensive manner using the left and right shifting operations described in logic diagram 310.

At step 220, a blue color difference component (Cb) of the pixel data is determined using the equation Cb=(B−Y)/2, where B is the blue color component of the pixel data and Y is the luminance color component (Y) of the pixel data determined at step 210. As in step 210, the color space coefficients used to determine the blue color difference component (Cb) of the pixel data are also in a binary form. Accordingly, the blue color difference component (Cb) of the pixel data may be calculated using binary arithmetic and avoid the use of multiplication, which allows the blue color difference component (Cb) of the pixel data to be determined in a relatively inexpensive manner.

Figure 3B:
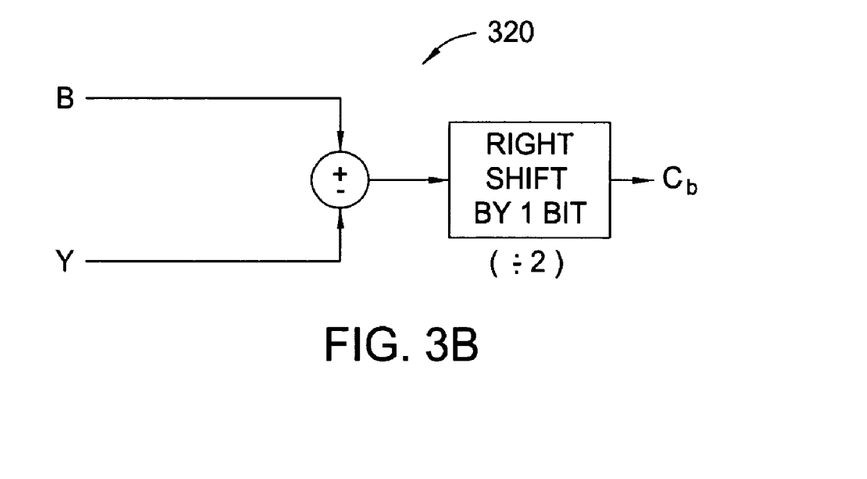
FIG. 3B illustrates a logic diagram for determining the blue color difference component (Cb) of the pixel data in accordance with one embodiment of the invention.

In accordance with one embodiment of the invention, the blue color difference component (Cb) of the pixel data may be determined according to a logic diagram 320 illustrated in FIG. 3B. As such, the blue color difference component (Cb) of the pixel data is determined by subtracting the luminance color component (Y) of the pixel data determined at step 210 from the blue color component of the pixel data and right shifting the sum by one bit (which is equivalent to a division by two). In one embodiment, a numerical rounding operation may be performed prior to right shifting the sum by one bit. As mentioned above, since right shifting operations are free to implement, the blue color difference component (Cb) of the pixel data may be determined in a relatively inexpensive manner using the right shifting operation described in logic diagram 320.

At step 230, a red color difference component (Cr) of the pixel data is determined using the equation Cr=(R−Y)/2, where R is the red color component of the pixel data and Y is the luminance color component of the pixel data determined at step 210. As in steps 210 and 220, the color space coefficients used to determine the red color difference component (Cr) of the pixel data are also in a binary form. Accordingly, the red color difference component (Cr) of the pixel data may be calculated using binary arithmetic and avoid the use of multiplication, which allows the red color difference component (Cr) of the pixel data to be determined in a relatively inexpensive manner.

Figure 3C:
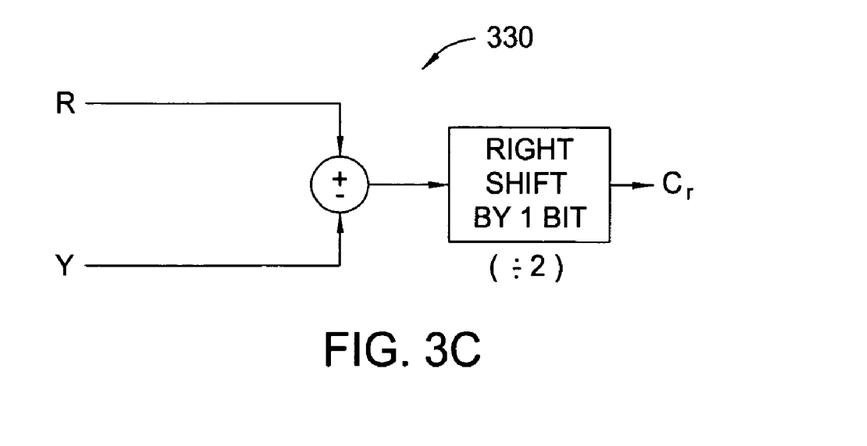
FIG. 3C illustrates a logic diagram for determining the red color difference component (Cr) of the pixel data in accordance with one embodiment of the invention.

In accordance with one embodiment of the invention, the red color difference component (Cr) of the pixel data may be determined according to a logic diagram 330 illustrated in FIG. 3C. Referring to FIG. 3C, the red color difference component (Cr) of the pixel data is determined by subtracting the luminance color component (Y) of the pixel data from the red color component of the pixel data and right shifting the result by one bit (which is equivalent to a division by two). In one embodiment, a numerical rounding operation may be performed prior to right shifting the result by one bit. As mentioned above, since right shifting operations are free to implement, the red color difference component (Cr) of the pixel data may be determined in a relatively inexpensive manner using the right shifting operation described in logic diagram 330.

Figure 4:
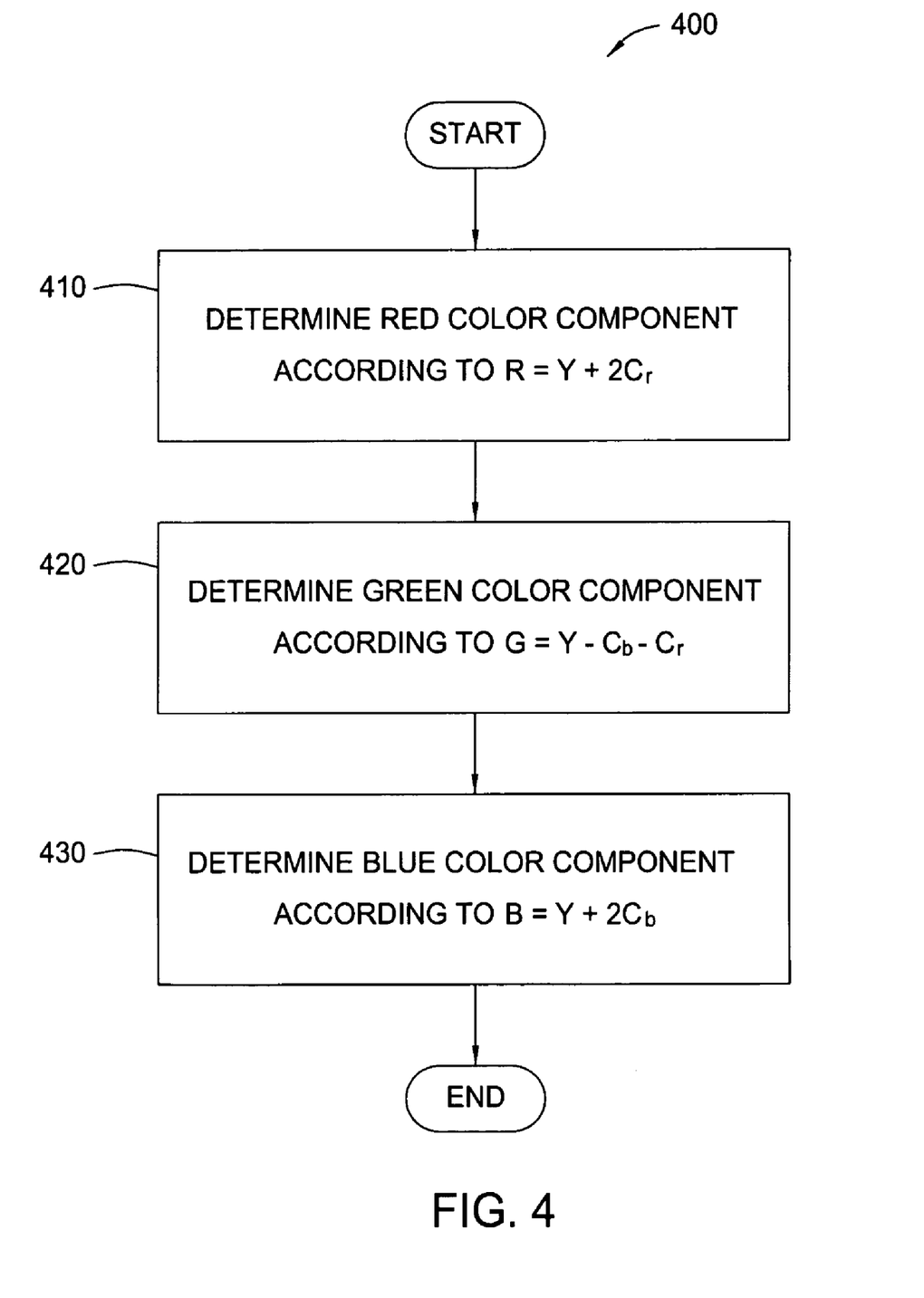
FIG. 4 illustrates a flow diagram of a method for converting pixel data from the YCbCr space to the RGB space in accordance with one embodiment of the invention.

FIG. 4 illustrates a flow diagram of a method 400 for converting pixel data from the YCbCr space to the RGB space in accordance with one embodiment of the invention. At step 410, a red color component (R) of the pixel data is determined using the equation R=Y+2Cr, where Y is the luminance color component of the pixel data and Cr is the red color difference component of the pixel data. As in the steps described with reference to FIG. 2, the color space coefficients used to determine the red color component (R) of the pixel data are also in a binary form. Accordingly, the red color component (R) of the pixel data may be calculated using binary arithmetic and avoid the use of multiplication, which allows the red color component (R) of the pixel data to be determined in a relatively inexpensive manner.

Figure 5A:
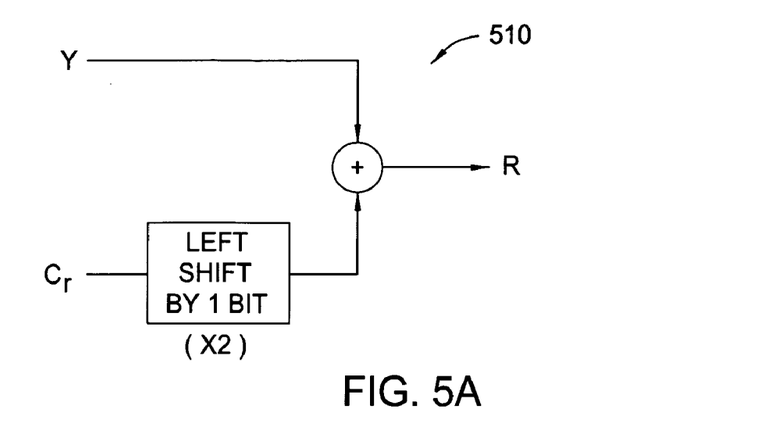
FIG. 5A illustrates a logic diagram for determining the red color component (R) of the pixel data in accordance with one embodiment of the invention.

In accordance with one embodiment of the invention, the red color component (R) of the pixel data may be determined according to a logic diagram 510 illustrated in FIG. 5A. Referring now to FIG. 5A, the red color component (R) of the pixel data is determined by left shifting the red color difference component (Cr) of the pixel data by one bit (which is equivalent to a multiplication by two) and adding the result to the luminance color component (Y) of the pixel data. As mentioned above, since left shifting operations are free to implement, the red color component (R) of the pixel data may be determined in a relatively inexpensive manner using the left shifting operation described in logic diagram 510.

At step 420, a green color component (G) of the pixel data is determined using the equation G=Y−Cb−Cr, where Y is the luminance color component of the pixel data, Cb is the blue color difference component of the pixel data and Cr is the red color difference component of the pixel data. As in step 410, the color space coefficients used to determine the green color component (G) of the pixel data are also in a binary form. Accordingly, the green color component (G) of the pixel data may be calculated using binary arithmetic and avoid the use of multiplication, which allows the green color component (G) of the pixel data to be determined in a relatively inexpensive manner.

Figure 5B:
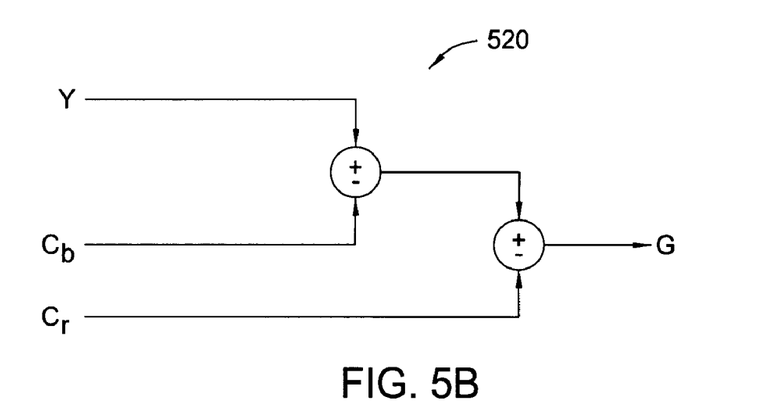
FIG. 5B illustrates a logic diagram for determining the green color component (G) of the pixel data in accordance with one embodiment of the invention.

In accordance with one embodiment of the invention, the green color component (G) of the pixel data may be determined according to a logic diagram 520 illustrated in FIG. 5B. Referring now to FIG. 5B, the green color component (G) of the pixel data is determined by subtracting the blue color difference component (Cb) of the pixel data from the luminance color component Y of the pixel data and further subtracting the red color difference component Cr from the result.

At step 430, a blue color component (B) of the pixel data is determined using the equation B=Y+2Cb, where Y is the luminance color component of the pixel data and Cb is the blue color difference component of the pixel data. As in steps 410 and 420, the color space coefficients used to determine the blue color component (B) of the pixel data are also in a binary form. Accordingly, the blue color component (B) of the pixel data may be calculated using binary arithmetic and avoid the use of multiplication, which allows the blue color component (B) of the pixel data to be determined in a relatively inexpensive manner.

Figure 5C:
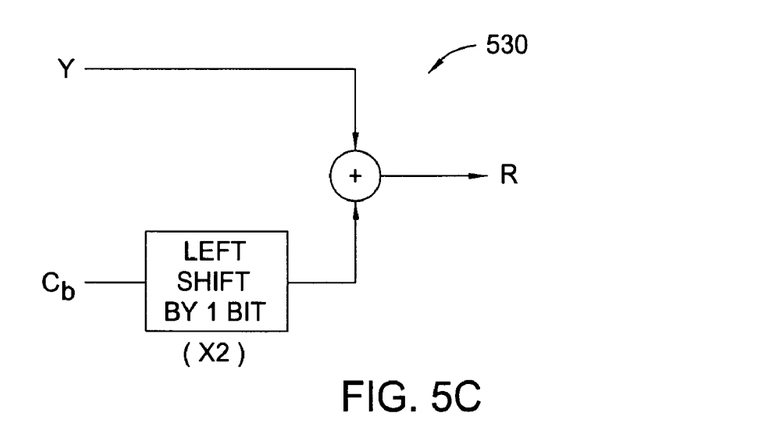
FIG. 5C illustrates a logic diagram for determining the blue color component (B) of the pixel data in accordance with one embodiment of the invention.

In accordance with one embodiment of the invention, the blue color component (B) of the pixel data may be determined according to a logic diagram 530 illustrated in FIG. 5C. Referring now to FIG. 5C, the blue color component (B) of the pixel data is determined by left shifting the blue color difference component Cr of the pixel data by one bit (which is equivalent to a multiplication by two) and adding the result to the luminance color component Y of the pixel data. As mentioned above, since left shifting operations are free to implement, the blue color component (B) of the pixel data may be determined in a relatively inexpensive manner using the left shifting operation described in logic diagram 530.

While the foregoing is directed to embodiments of the present invention, other and further embodiments of the invention may be devised without departing from the basic scope thereof, and the scope thereof is determined by the claims that follow.

What is claimed is:

1. A graphics processing unit, comprising:
    a memory for storing pixel data in binary form, wherein the pixel data are in a red, green and blue (RGB) color space; and
    a display pipeline having an RGB color space to a luminance color, blue color difference and red color difference (YCbCr) color space converter module configured to convert the pixel data from the RGB color space to the YCbCr color space, wherein the RGB to YCbCr color space converter module generates a luminance color component (Y) of the pixel data by adding ¼ of a red color (R) component of the pixel data to ½ of a green color (G) component of the pixel data and ¼ of a blue color (B) component of the pixel data, wherein the RGB to YCbCr color space converter module determines the luminance color component (Y) of the pixel data by:
        left shifting the green color (G) component of the pixel data by one bit;
        adding the result of the left shifting to the red color (R) component of the pixel data and the blue color (B) component of the pixel data; and
        right shifting the sum by two bits.

2. The graphics processing unit of claim 1, wherein the RGB to YCbCr color space converter module performs a numerical rounding operation on the (G) component prior to the right shifting of the sum to reduce errors and improve the accuracy of the result.

3. The graphics processing unit of claim 1, wherein the RGB to YCbCr color space converter module determines a blue color difference component (Cb) of the pixel data by subtracting the luminance color component (Y) of the pixel data from the blue color (B) component; and dividing the result by two.

4. The graphics processing unit of claim 1, wherein the RGB to YCbCr color space converter module determines a blue color difference component (Cb) of the pixel data by subtracting the luminance color component (Y) of the pixel data from the blue color (B) component of the pixel data; and right shifting the sum by one bit.

5. The graphics processing unit of claim 3, wherein the RGB to YCbCr color space converter module determines a red color difference component (Cr) of the pixel data by subtracting the luminance color component (Y) of the pixel data from the red color (R) component of the pixel data; and dividing the result by two.

6. The graphics processing unit of claim 4, wherein the RGB to YCbCr color space converter module determines a red color difference component (Cr) of the pixel data by subtracting the luminance color component (Y) of the pixel data from the red color (R) component of the pixel data; and right shifting the result by one bit.

7. The graphics processing unit of claim 1, further comprising a memory management unit for reading the pixel data from the memory and passing the pixel data to the display pipeline.

8. The graphics processing unit of claim 1, wherein the display pipeline further comprises a YCbCr to RGB color space converter module configured to convert the pixel data from the YCbCr color space to the RGB color space, wherein the YCbCr to RGB color space converter module generates the red color (R) component of the pixel data by adding the luminance color component (Y) to twice the red color difference component (Cr) of the pixel data.

9. The graphics processing unit of claim 8, wherein the red color (R) component of the pixel data is generated by left shifting the red color difference component (Cr) of the pixel data by one bit; and adding the result of the left shifting to the luminance color component (Y) of the pixel data.

10. The graphics processing unit of claim 8, wherein the YCbCr to RGB color space converter module further generates the green color (G) component of the pixel data by subtracting the red color difference component (Cr) and the blue color difference component (Cb) of the pixel data from the luminance color component (Y) of the pixel data.

11. The graphics processing unit of claim 10, wherein the YCbCr to RGB color space converter module further generates the blue color (B) component of the pixel data by adding the luminance color component (Y) of the pixel data to twice the blue color difference component (Cb) of the pixel data.

12. The graphics processing unit of claim 10, wherein the YCbCr to RGB color space converter module further generates the blue color (B) component of the pixel data by left shifting the blue color difference (Cb) component of the pixel data by one bit; and adding the result to the luminance color component (Y) of the pixel data.

13. A graphics processing unit, comprising:
a memory for storing pixel data in a red, green and blue (RGB) color space, wherein the pixel data are in binary form; and
a display pipeline having an RGB color space to a luminance color, blue color difference and red color difference (YCbCr) color space converter module configured to convert the pixel data from the RGB color space to the YCbCr color space, wherein the RGB to YCbCr color space converter module determines a luminance color component (Y) of the pixel data by:
left shifting a green color (G) component of the pixel data by one bit;
adding the result of the left shifting to a red color (R) component of the pixel data and a blue color (B) component of the pixel data; and
right shifting the sum by two bits.

14. A method for processing pixel data, comprising:
receiving the pixel data in a red, blue and green (RGB) color space; and
converting the pixel data from the RGB color space to a luminance, blue color difference and red color difference (YCbCr) color space by adding ¼ of a red color (R) component of the pixel data to ½ of a green color (G) component of the pixel data and ¼ of a blue color (B) component of the pixel data to generate a luminance color component (Y) of the pixel data, wherein the RGB to YCbCr color space converter module determines the luminance color component (Y) of the pixel data by:
left shifting the green color (G) component of the Pixel data by one bit;
adding the result of the left shifting to the red color (R) component of the pixel data and the blue color (B) component of the pixel data; and
right shifting the sum by two bits.

15. The method of claim 14, wherein converting the pixel data from the RGB color space to YCbCr color space comprises generating a blue color difference component (Cb) of the pixel data by subtracting the luminance color component (Y) of the pixel data from the blue color (B) component; and dividing the result by two.

16. The method of claim 15, wherein converting the pixel data from the RGB color space to YCbCr color space comprises generating a red color difference component (Cr) of the pixel data by subtracting the luminance color component (Y) of the pixel data from the red color (R) component of the pixel data; and dividing the result by two.

17. The method of claim 16, comprising converting the pixel data from the YCbCr color space to the RGB color space by adding the luminance color component (Y) of the pixel data to twice the red color difference component (Cr) of the pixel data to generate the red color (R) component of the pixel data wherein the Cr component is shifted left by one bit.

18. The method of claim 17, wherein converting the pixel data from the YCbCr color space to the RGB color space comprises generating the green color (G) component of the pixel data by subtracting the red color difference component (Cr) of the pixel data and the blue color difference component (Cb) of the pixel data from the luminance color component (Y) of the pixel data.

19. The method of claim 18, wherein converting the pixel data from the YCbCr color space to the RGB color space comprises generating the blue color (B) component of the pixel data by adding the luminance color component (Y) of the pixel data to twice the blue color difference component (Cb) of the pixel data, wherein the Cb component is shifted left by one bit.

20. The graphics processing unit of claim 13 including performing a numerical rounding operation on the G component prior to the right shifting of the sum to reduce errors and improve the accuracy of the result.

21. The graphics processing unit of claim 2 including adding $2^{(s-1)}$ where S is the number of shifts) to the entire sum prior to right shifting the sum.

* * * * *

UNITED STATES PATENT AND TRADEMARK OFFICE
CERTIFICATE OF CORRECTION

| | | |
|---|---|---|
| PATENT NO. | : 7,050,065 B1 | Page 1 of 1 |
| APPLICATION NO. | : 10/825259 | |
| DATED | : May 23, 2006 | |
| INVENTOR(S) | : Young | |

It is certified that error appears in the above-identified patent and that said Letters Patent is hereby corrected as shown below:

Column 10, Claim 14, Line 14: Change "Pixel" to --pixel--

Column 10, Claim 15, Line 21: After "space", insert --further--

Signed and Sealed this

Twenty-seventh Day of February, 2007

JON W. DUDAS
*Director of the United States Patent and Trademark Office*